United States Patent
Sano et al.

(10) Patent No.: US 11,530,949 B2
(45) Date of Patent: Dec. 20, 2022

(54) SPECTRAL FILTER MODULE, SPECTROSCOPIC CAMERA, AND ELECTRONIC DEVICE

(71) Applicant: Seiko Epson Corporation, Tokyo (JP)

(72) Inventors: Akira Sano, Matsumoto (JP); Hideaki Kasahara, Matsumoto (JP)

(73) Assignee: SEIKO EPSON CORPORATION

( * ) Notice: Subject to any disclaimer, the term of this patent is extended or adjusted under 35 U.S.C. 154(b) by 412 days.

(21) Appl. No.: 16/720,046

(22) Filed: Dec. 19, 2019

(65) Prior Publication Data

US 2020/0200607 A1 Jun. 25, 2020

(30) Foreign Application Priority Data

Dec. 20, 2018 (JP) .............................. JP2018-238051

(51) Int. Cl.
*G01J 3/28* (2006.01)
(52) U.S. Cl.
CPC ..... *G01J 3/2823* (2013.01); *G01J 2003/2826* (2013.01)
(58) Field of Classification Search
CPC .................................................. G01J 3/2823
USPC ......................................................... 359/578
See application file for complete search history.

(56) References Cited

U.S. PATENT DOCUMENTS

| 6,710,872 B1 | 3/2004 | Nakamura et al. |
| 2013/0279005 A1* | 10/2013 | Sano .................... G02B 26/001 359/578 |

FOREIGN PATENT DOCUMENTS

| JP | 2001-183232 A | 7/2001 |
| JP | 2002-243937 A | 8/2002 |
| JP | 2013-064735 A | 4/2013 |
| JP | 2014-056072 A | 3/2014 |
| JP | 2017-187799 A | 10/2017 |

* cited by examiner

*Primary Examiner* — Joel W Fosselman
(74) *Attorney, Agent, or Firm* — Harness, Dickey & Pierce, P.L.C.

(57) ABSTRACT

A spectral filter module includes a spectral filter that splits light having a wavelength corresponding to an input drive voltage from incident light and outputs the light, a drive unit that outputs the drive voltage based on an input wavelength command value, and a drive controller that outputs the wavelength command value and changes the wavelength command value every time a trigger signal is input from the outside.

2 Claims, 5 Drawing Sheets

| No | WAVELENGTH COMMAND VALUE |
|---|---|
| 1 | Vc(1) |
| 2 | Vc(2) |
| 3 | Vc(3) |
| ⋮ | ⋮ |
| n | Vc(n) |

SPECTRAL FILTER MODULE, SPECTROSCOPIC CAMERA, AND ELECTRONIC DEVICE

The present application is based on, and claims priority from, JP Application Serial Number 2018-238051, filed Dec. 20, 2018, the disclosure of which is hereby incorporated by reference herein in its entirety.

BACKGROUND

1. Technical Field

The present disclosure relates to a spectral filter module, a spectroscopic camera and an electronic device.

2. Related Art

There is known a spectral filter module that splits light having a predetermined wavelength from incident light and outputs the light (for example, see JP-A-2014-56072).

The spectral filter module (colorimetric sensor) described in JP-A-2014-56072 includes a spectral filter (wavelength variable interference filter) that transmits light having a predetermined wavelength among reflected light reflected by a measurement object, and a drive unit (voltage application unit) that applies drive voltage to the spectral filter. A control device that controls the spectral filter module outputs a control signal indicating a target wavelength to the drive unit. When the drive unit applies the drive voltage to the spectral filter based on the control signal, the spectral filter transmits light having the target wavelength.

However, a spectral filter module described in JP-A-2014-56072 needs to send a control signal using a control line such as USB, for example, when switching a transmission wavelength of the spectral filter to a plurality of wavelengths. Specifically, the spectral filter module needs to receive the control signal indicating each target wavelength from the control device one by one and perform arithmetic processing based on the received control signal. Therefore, it is difficult to switch the transmission wavelength of the spectral filter module at high speed.

SUMMARY

A spectral filter module according to an aspect of the present disclosure includes a spectral filter that splits light having a wavelength corresponding to an input drive voltage from incident light and outputs the light, a drive unit that outputs the drive voltage based on an input wavelength command value, and a drive control unit that outputs the wavelength command value and changes the wavelength command value every time a trigger signal is input from the outside.

The spectral filter module according to the aspect of the present disclosure may further include a storage unit that stores a wavelength list that lists a plurality of the wavelength command values, in which the drive control unit may output the wavelength command value selected from the wavelength list, and switches the wavelength command value selected every time the trigger signal is input.

A spectroscopic camera according to an aspect of the present disclosure includes the above-described spectral filter module, a light-receiving unit that receives light split from the spectral filter and outputs a light-receiving signal corresponding to an intensity of the light, and a light-receiving control unit that outputs the trigger signal and captures the light-receiving signal corresponding to an output timing of the trigger signal.

An electronic device according to an aspect of the present disclosure includes the above described spectral filter module and a trigger signal output unit that outputs the trigger signal.

DESCRIPTION OF EXEMPLARY EMBODIMENTS

Hereinafter, a spectrometer 100 according to an embodiment of the present disclosure will be described.

Figure 1:
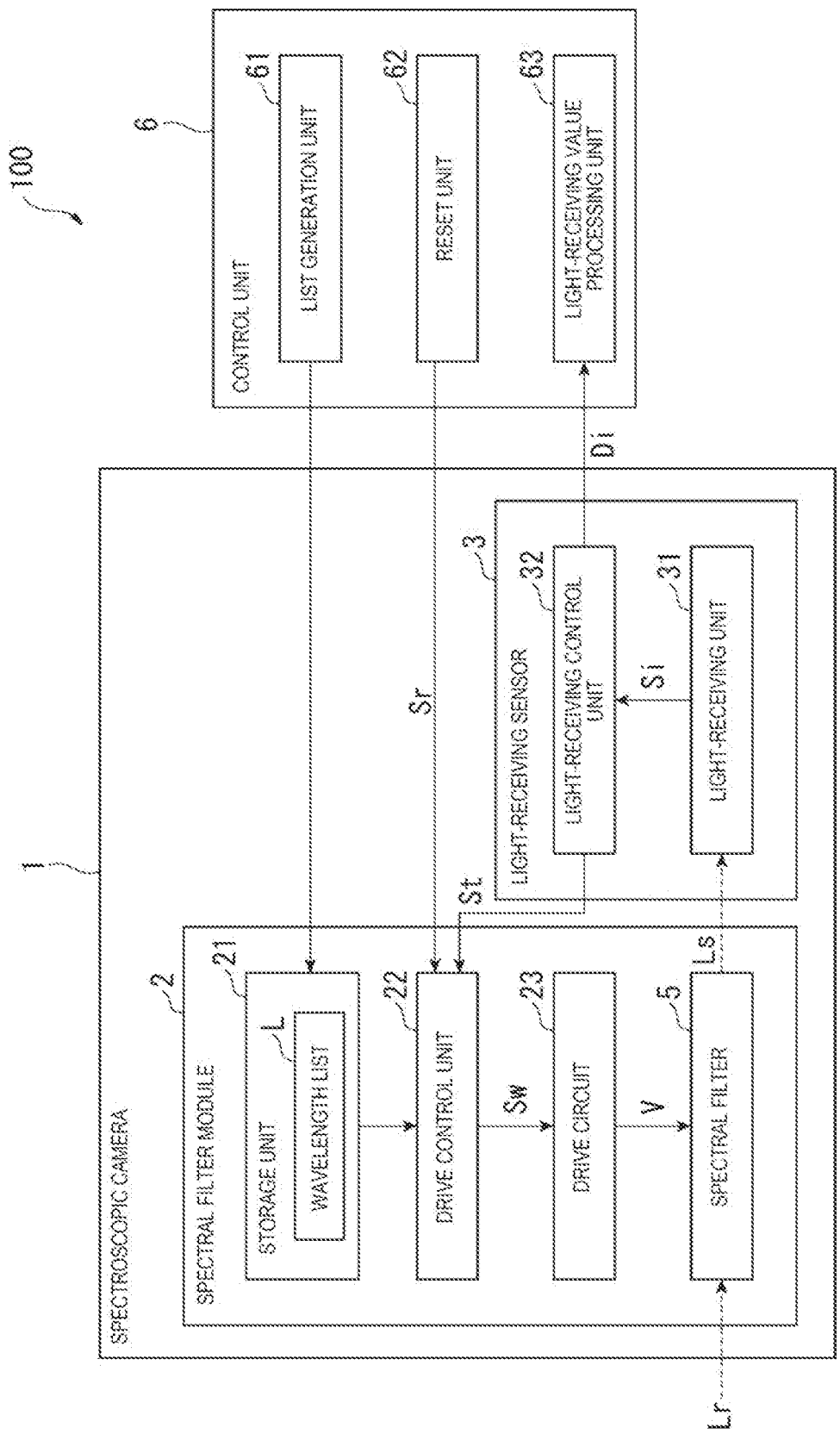
FIG. 1 is a block diagram showing a schematic configuration of a spectrometer according to an embodiment of the present disclosure.

As shown in FIG. 1, the spectrometer 100 according to the embodiment includes a spectroscopic camera 1 that detects light having a predetermined wavelength, and a control unit 6 that controls the spectroscopic camera 1. The spectroscopic camera 1 splits light Ls having a predetermined wavelength among reflected light Lr reflected by an object, and sends a received light value Di acquired based on the split light Ls to the control unit 6. The control unit 6 analyzes spectrum information based on the received light value Di input from the spectroscopic camera 1. Accordingly, the spectrometer 100 can measure a color of the object and analyze a substance thereof. Such spectrometer 100 can be used by being incorporated in an electronic device such as a printer or a projector.

Configuration of Spectroscopic Camera 1

The spectroscopic camera 1 may perform spectroscopic measurement with respect to light from one point, or may acquire a spectroscopic image. The spectroscopic camera 1 includes a spectral filter module 2 that splits light having a predetermined wavelength from incident light, and a light-receiving sensor 3 that receives light split by the spectral filter module 2 and outputs a light-receiving signal Si.

Spectral Filter Module 2

The spectral filter module 2 includes a spectral filter 5, a storage unit 21, a drive control unit 22, and a drive circuit 23.

Figure 2:
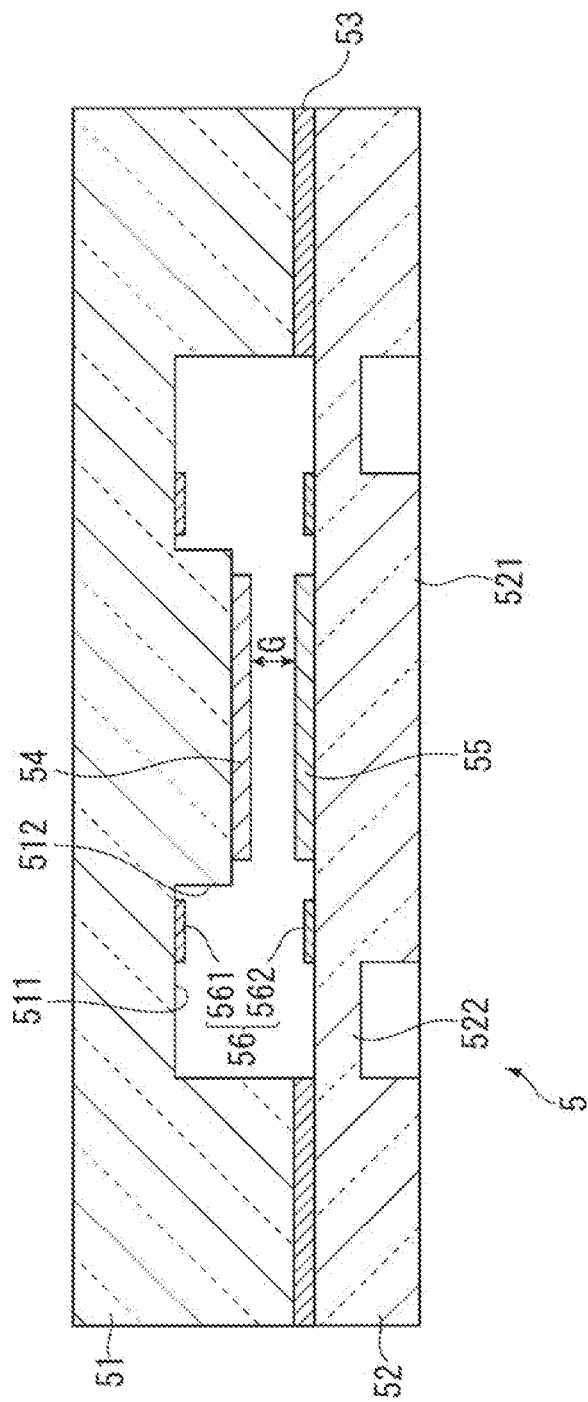
FIG. 2 is a cross-sectional view showing a schematic configuration of a spectral filter according to the embodiment.

The spectral filter 5 is, for example, a wavelength variable interference filter. As shown in FIG. 2, the spectral filter 5 includes a first substrate 51 and a second substrate 52. The first substrate 51 includes, for example, an electrode arrangement groove 511 formed by etching and a reflective film installation portion 512, on a surface facing the second substrate 52. The second substrate 52 includes a movable portion 521 and a diaphragm portion 522 that is provided on an outer periphery of the movable portion 521 and has a thickness dimension smaller than that of the movable portion 521. The second substrate 52 is fixed to the first substrate 51 through an adhesive layer 53 on an outer periphery of the diaphragm portion 522.

In the spectral filter 5, first reflective film 54 provided in the reflective film installation portion 512 of the first substrate 51 and second reflective film 55 provided in the movable portion 521 of the second substrate 52 are arranged to face one another through a gap G. The first reflective film 54 and the second reflective film 55 have conductivity respectively, and constitutes a capacitance detection unit for detecting the capacitance of the gap G.

Further, the first electrode 561 provided on the first substrate 51 and the second electrode 562 provided on the second substrate 52 are arranged to face one another, and constitute an electrostatic actuator 56. When drive voltage V is applied between the first electrode 561 and the second electrode 562, the diaphragm portion 522 of the second substrate 52 is bent, and the movable portion 521 is displaced toward the first substrate 51 side. Accordingly, a dimension of the gap G varies and light having a wavelength corresponding to the dimension of the gap G is transmitted from the spectral filter 5. Here, the wavelength (transmission wavelength) of the light transmitted by the spectral filter 5 corresponds to the value of the drive voltage V to be applied.

Returning to FIG. 1, the storage unit 21 stores a wavelength list L as data for controlling the spectral filter 5.

Figures 3, 4:
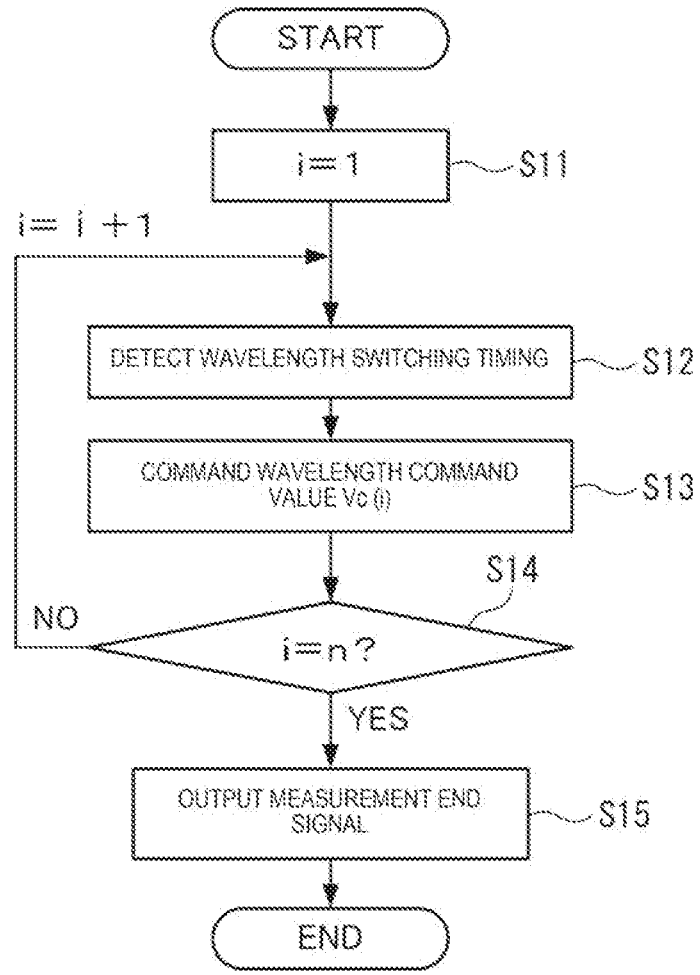
FIG. 3 is a diagram illustrating a wavelength list according to the embodiment.
FIG. 4 is a flowchart showing processing of a drive control unit according to the embodiment.

FIG. 3 is a diagram showing an example of the wavelength list L. In the wavelength list L, a list of a plurality of wavelength command values Vc (1) to Vc (n) respectively corresponding to a plurality of measurement wavelengths is stored in a state corresponding to measurement numbers. The wavelength command value Vc in the present embodiment is a command value related to the capacitance detected by the gap G of the spectral filter 5.

The drive control unit 22 is configured using, for example, a microcomputer, and outputs a wavelength command signal Sw to the drive circuit 23. The wavelength command signal Sw includes any one of wavelength command value Vc (i) among the wavelength command values Vc (1) to Vc (n) stored in the wavelength list L. The drive control unit 22 switches the wavelength command value Vc (i) included in the wavelength command signal Sw according to the wavelength list L every time a trigger signal St is input. Specifically, the drive control unit 22 selects the wavelength command value Vc (i+1) located at the measurement number next to the currently selected wavelength command value Vc (i) in the wavelength list L every time the trigger signal St is input, and outputs the selected value as the wavelength command signal Sw.

Further, when a reset signal Sr is input, the drive control unit 22 selects the wavelength command value Vc (1) corresponding to the first measurement number in the wavelength list L regardless of the currently selected wavelength command value Vc, and outputs the selected value.

The drive circuit 23 is a drive unit according to the present disclosure, and applies the drive voltage V to the electrostatic actuator 56 based on the wavelength command value Vc included in the wavelength command signal Sw input from the drive control unit 22.

Further, the drive circuit 23 constitutes a feedback control system, and increases or decreases the drive voltage V applied to the electrostatic actuator 56 so that the capacitance detected by the gap G of the spectral filter 5 becomes the capacitance corresponding to the wavelength command value Vc. Accordingly, the gap G in the spectral filter 5 is adjusted to a dimension corresponding to the measurement wavelength.

Light-Receiving Sensor 3

The light-receiving sensor 3 includes a light-receiving unit 31 and a light-receiving control unit 32 that controls the light-receiving unit 31.

The light-receiving unit 31 receives the light Ls split by the spectral filter 5, converts the received light to the light-receiving signal Si according to a light intensity of the received light Ls, and outputs the signal. The light-receiving unit 31 is configured using, for example, CMOS.

Figure 5:
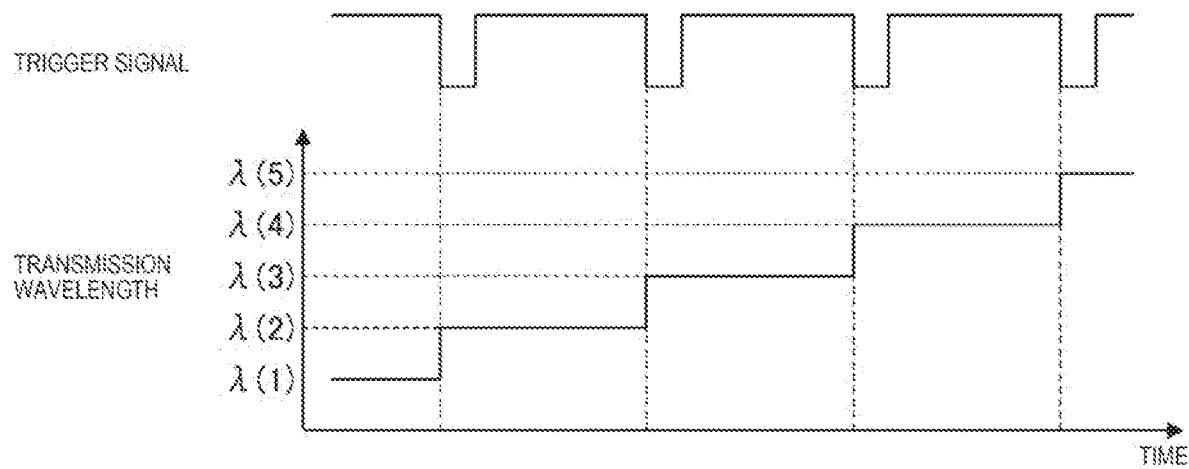
FIG. 5 is an example of a time chart showing a trigger signal and a transmission wavelength of the spectral filter.

The light-receiving control unit 32 outputs a pulse signal (trigger signal St) as shown in the upper portion of FIG. 5, in order to control capture timing of the light-receiving signal Si from the light-receiving unit 31. That is, the light-receiving control unit 32 captures the light-receiving signal Si from the light-receiving unit 31 at timing according to the trigger signal St, and outputs the value of the captured light-receiving signal Si (light-receiving value Di) to the control unit 6. In the present embodiment, the light-receiving signal Si is captured at the timing when the trigger signal St is switched from a low level to a high level.

Further, the light-receiving control unit 32 outputs the trigger signal St to the drive control unit 22 of the spectral filter 5 in addition to using the trigger signal St itself.

In the present embodiment, the light-receiving control unit 32 continuously outputs the trigger signal St of the low level or the high level. Therefore, in the present embodiment, "output (or input) of the trigger signal St" corresponds to switching of the trigger signal St from the low level to the high level or from the high level to the low level.

The light-receiving sensor 3 having the above configuration is coupled to the spectral filter module 2 through a signal line for sending the trigger signal St, and coupled to the control unit 6 through a control line for sending the light-receiving value Di.

Control Unit 6

The control unit 6 can be configured using a personal computer or the like. Further, when the spectrometer 100 is incorporated in an electronic device such as a printer or a projector, the control unit 6 may be configured as a controller that controls overall operations of the electronic device.

As shown in FIG. 1, the control unit 6 includes a list generation unit 61, a reset unit 62, and a light-receiving value processing unit 63. Although not shown, the control unit 6 may include an interface coupled to an external device or an operation unit that accepts an operation by a user.

The list generation unit 61 acquires wavelength information that the user desires to measure through the external device or the operation unit, and generates the wavelength list L based on the wavelength information. The list generation unit 61 sends the generated wavelength list L to the spectroscopic camera 1 and stores the generated wavelength list L in the storage unit 21. When the wavelength list L is already stored in the storage unit 21, the list generation unit 61 may update the wavelength list L stored in the storage unit 21.

The list generation unit 61 also stores the wavelength list L sent to the spectroscopic camera 1 in a storage unit (not shown) in the control unit 6.

The reset unit 62 outputs the reset signal Sr to the spectroscopic camera 1 when a predetermined condition is satisfied. The predetermined condition can be set arbitrarily, and it can be considered as an example of the predetermined condition that an operation signal indicating reset is input from the external device or the operation unit, that the light-receiving value processing unit 63 cannot appropriately acquire the light-receiving value Di, or the like. Further, the reset signal Sr may be a pulse signal as is the case with the trigger signal St.

The light-receiving value processing unit 63 analyzes spectrum information that is a combination of the measurement wavelength and the light-receiving value Di, based on the wavelength list L stored in the storage unit in the control unit 6 and the light-receiving value Di input from the light-receiving sensor 3.

The control unit 6 having the above configuration is coupled to the spectral filter module 2 through a signal line for sending the reset signal Sr and a control line for sending the wavelength list L and the like.

Operation of Spectrometer 100

An example in which the spectrometer 100 according to the embodiment performs a spectroscopic measurement operation will be described. In the following description, it is assumed that the storage unit 21 stores the wavelength list L.

First, the control unit 6 outputs a measurement start signal to the spectroscopic camera 1 based on an operation signal input from the external device or the operation unit. Accordingly, in the spectroscopic camera 1, the drive control unit 22 and the light-receiving control unit 32 start processing respectively.

Wavelength switching processing performed by the drive control unit 22 will be described with reference to FIG. 4.

First, the drive control unit 22 initializes a variable i (i=1) indicating the wavelength command value Vc (step S11).

Thereafter, the drive control unit 22 detects wavelength switching timing based on the trigger signal St (step S12). In the present embodiment, the wavelength switching timing is set to a timing at which the trigger signal St falls from the high level to the low level.

Next, the drive control unit 22 selects the wavelength command value Vc (i) from the wavelength list L at the detected wavelength switching timing, and outputs the wavelength command signal Sw including the wavelength command value Vc (i) to the drive circuit 23 (step S13).

The drive circuit 23 to which the wavelength command signal Sw is input, applies the drive voltage V based on the wavelength command value Vc (i) to the spectral filter 5. Accordingly, the spectral filter 5 transmits light having a measurement wavelength λ (i) corresponding to the wavelength command value Vc (i), and the light-receiving sensor 3 outputs the light-receiving value Di corresponding to the light intensity of the measurement wavelength λ (i).

Thereafter, the drive control unit 22 determines whether or not the variable i is n (step S14), and when the drive control unit 22 determines No, the drive control unit 22 adds "1" to the variable i and returns the process to step S12. Meanwhile, when the drive control unit 22 determines Yes, the drive control unit 22 outputs a measurement end signal to the light-receiving control unit (step S15), and ends the flow.

According to the above processing, the drive control unit 22 sequentially switches the wavelength command value Vc included in the wavelength command signal Sw, from the wavelength command value Vc (1) to the wavelength command value Vc (n) stored in the wavelength list L, every time the trigger signal St is input (specifically, every time the trigger signal St falls from the high level to the low level). Accordingly, as shown in FIG. 5, the transmission wavelength of the spectral filter 5 is sequentially switched from the wavelength λ (1) corresponding to the wavelength command value Vc (1) to the wavelength λ (n) corresponding to the wavelength command value Vc (n).

In the above processing, the drive control unit 22 returns the process to step S11 when the reset signal Sr is input during the flow shown in FIG. 4, and initializes the variable i indicating the wavelength command value Vc (i=1). Accordingly, the drive control unit 22 reselects the wavelength command value Vc from the beginning of the wavelength list L.

Figure 6:
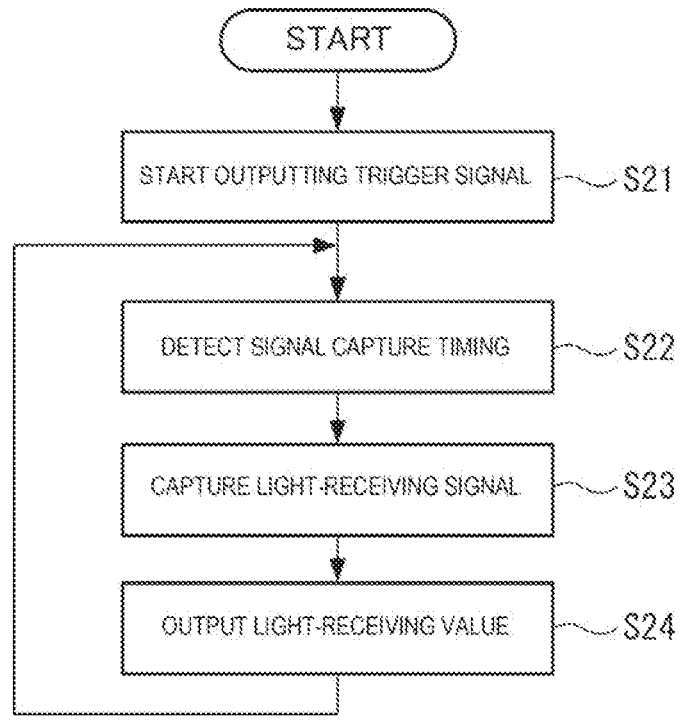
FIG. 6 is a flowchart showing processing of the light-receiving control unit according to the embodiment.

Next, light-receiving control processing performed by the light-receiving control unit 32 will be described with reference to FIG. 6.

First, the light-receiving control unit 32 starts outputting the trigger signal St at a predetermined interval (step S21).

Next, the light-receiving control unit 32 detects signal capture timing based on the trigger signal St (step S22). In the present embodiment, the signal capture timing is set to timing at which the trigger signal St rises from the low level to the high level. Accordingly, it is possible to wait for the transmission wavelength of the spectral filter 5 to be changed and stabilized for the time from the falling to the rising of the trigger signal St.

Next, the light-receiving control unit 32 captures the light-receiving signal Si from the light-receiving unit 31 at the detected signal capture timing (step S23). Then, the light-receiving control unit 32 outputs the light-receiving value Di that is an output value of the captured light-receiving signal Si to the control unit 6 (step S24).

Thereafter, the light-receiving control unit 32 returns the process to step S22 and continues the processing. However, when the measurement end signal is input from the drive control unit 22, the light-receiving control unit 32 ends the flow.

According to the above processing, in the spectral filter module 2, the transmission wavelength change timing of the spectral filter 5 and the capture timing of the light-receiving signal Si are linked. Accordingly, the control unit 6 can acquire the light-receiving value Di when the transmission wavelength of the spectral filter 5 is stable.

Effects of the Present Embodiment

The spectral filter module 2 according to the present embodiment includes the spectral filter 5 that transmits light having a wavelength corresponding to the input drive voltage V, the drive circuit 23 that outputs the drive voltage V based on the input wavelength command value Vc, and the drive control unit 22 that outputs the wavelength command value Vc and switches the wavelength command value Vc every time the trigger signal St is input from the outside. Here, the trigger signal St serving as a trigger for switching the transmission wavelength of the spectral filter 5 may be a 1-bit signal such as the pulse signal. That is, in the spectral filter module 2 according to the present embodiment, a simple trigger signal St is received in order to switch the transmission wavelength of the spectral filter 5, so that complicated arithmetic processing is not required. Therefore, the time taken to switch the transmission wavelength of the spectral filter 5 can be shortened. Further, a control line for wavelength switching is not required between the spectral filter module 2 and the outside, so that the configuration of the spectral filter module 2 can also be simplified.

In the spectral filter module 2 of the present embodiment, the drive control unit 22 is configured to switch the wavelength command value Vc according to the wavelength list L stored in the storage unit 21. Therefore, by storing the wavelength command value Vc corresponding to the measurement wavelength desired by the user in the wavelength list L, the transmission wavelength of the spectral filter 5 can be easily switched to the measurement wavelength desired by the user.

The spectroscopic camera 1 according to the present embodiment includes the spectral filter module 2 as described above, the light-receiving unit 31 that receives the light Ls having a wavelength transmitted from the spectral filter 5 and outputs the light-receiving signal Si corresponding to the intensity of the light Ls, and the light-receiving control unit 32 that outputs the trigger signal St and captures the light-receiving signal Si at the signal capture timing corresponding to an output timing of the trigger signal St.

Typically, immediately after the transmission wavelength of the spectral filter is switched, the light-receiving signal output from the light-receiving sensor is not stable. Therefore, in the related art, a control device that controls the spectroscopic camera acquires a stable light-receiving value by linking the timing that switches the wavelength command value with the capture timing of the light-receiving signal from the light-receiving sensor.

Meanwhile, in the present embodiment, the light-receiving control unit 32 is configured to capture the light-receiving signal Si at the signal capture timing corresponding to the trigger signal St. Accordingly, the control unit 6 that controls the spectroscopic camera 1 can acquire the stable light-receiving value Di, simplifying an own configuration.

Modification Example

The present disclosure is not limited to the above-described embodiments, and modifications, improvements, and the like within scope in which an object of the present disclosure can be achieved are included in the present disclosure.

Modification Example 1

In the above embodiment, the spectrometer 100 has been described. However, the electronic device according to the present disclosure is not limited to the spectrometer 100, and may be a projector, a printer, or the like in which the spectrometer 100 is incorporated.

Further, the electronic device according to the present disclosure may not include the light-receiving sensor 3.

Figure 7:
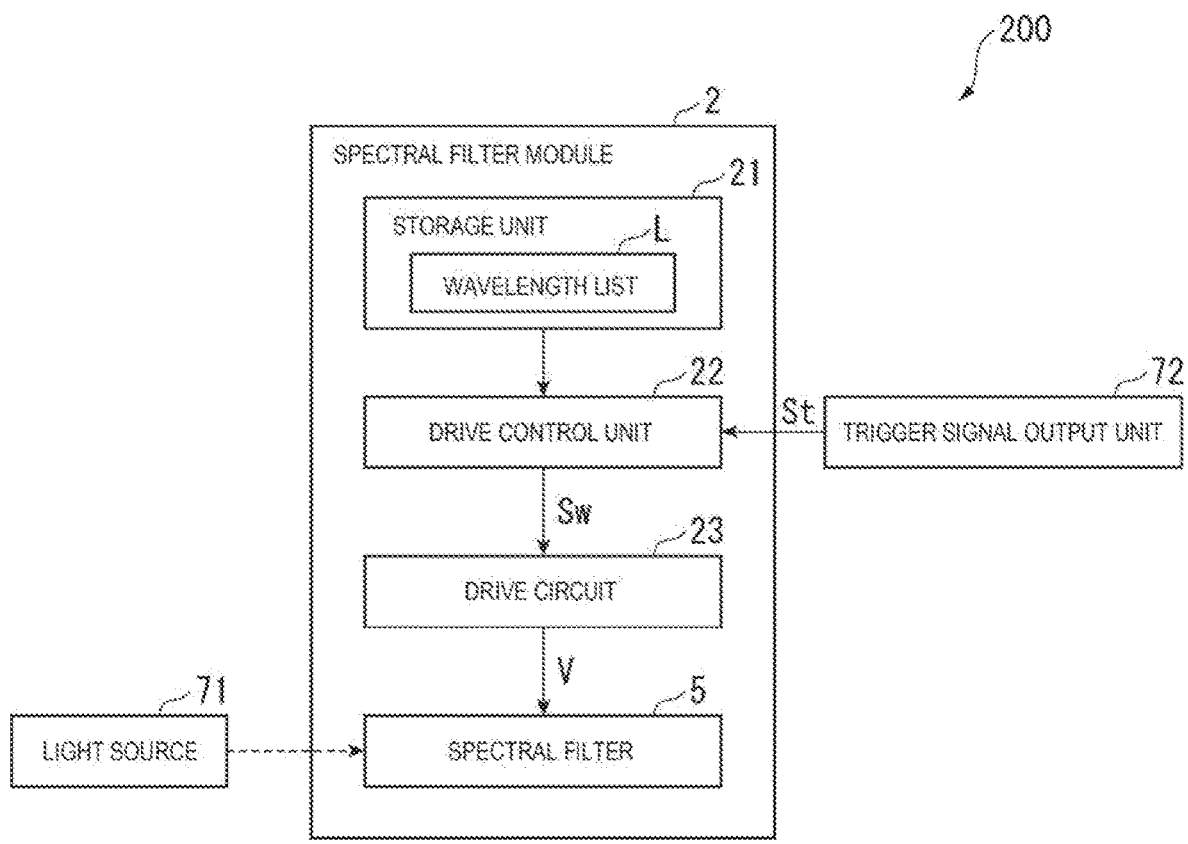
FIG. 7 is a block diagram showing a schematic configuration of an electronic device according to a Modification Example of the embodiment.

FIG. 7 is a diagram showing a schematic configuration of an electronic device 200 configured as, for example, a spectral illumination device or a visible light communication device. In FIG. 7, the same reference numerals are given to the same configurations as in the above-described embodiment.

As shown in FIG. 7, the electronic device 200 includes a spectral filter module 2, a light source 71, and a trigger signal output unit 72. In the electronic device 200, the drive control unit 22 switches the wavelength command value Vc every time the trigger signal St is input from the trigger signal output unit 72. Accordingly, the light emitted from the light source 71 is sequentially split into different wavelengths by the spectral filter 5.

Also in such electronic device 200, as in the above-described embodiment, the time taken to switch the wavelength that the spectral filter 5 splits can be shortened.

Modification Example 2

In the above embodiment, the pulse signal output at a predetermined interval is illustrated as the trigger signal St. However, the present disclosure is not limited to this, and an arbitrary signal can be used. For example, a 1-bit signal that can be switched on (high level) and off (low level) at an arbitrary interval can be used.

Modification Example 3

In the above embodiment, the drive control unit switches the wavelength command value Vc according to the wavelength list L, but the present disclosure is not limited to this. For example, every time the trigger signal St is input, the drive control unit 22 may increase or decrease the wavelength command value Vc in phases by a preset wavelength.

Modification Example 4

The wavelength command value Vc according to the above embodiment is a capacitance value in the gap G of the spectral filter 5, but the present disclosure is not limited to this. For example, the wavelength command value according to the present disclosure may be a value of the drive voltage V applied to the electrostatic actuator 56 or a value of the wavelength to be measured.

Specifically, when the wavelength command value according to the present disclosure is the value of the drive voltage V, feedback control as in the above embodiment may not be performed. When the wavelength command value according to the present disclosure is the value of the wavelength, the drive control unit 22 may calculate (convert) the capacitance value in the gap G of the spectral filter 5 from the value of the wavelength and send the value to the drive circuit 23.

Further, the wavelength list L may include various other information in addition to the measurement numbers 1 to n and the wavelength command value Vc.

For example, in the spectral filter according to the present disclosure, when performing two-electrode drive described in JP-A-2017-187799 or the like, the wavelength list L may include a bias voltage added to the drive voltage V.

Further, the wavelength list L may include parameters (specifically, numerical values of P, I, and D for PID control) for adjusting responsiveness of the feedback control.

The wavelength list L is not used for control, but may include a value of the wavelength as a value to be displayed to the user.

Modification Example 5

In the above embodiment, the drive control unit 22 detects the timing at which the trigger signal St falls as the wavelength switching timing, and switches the wavelength command value Vc at the wavelength switching timing, but the present disclosure is not limited to this.

Figure 8:
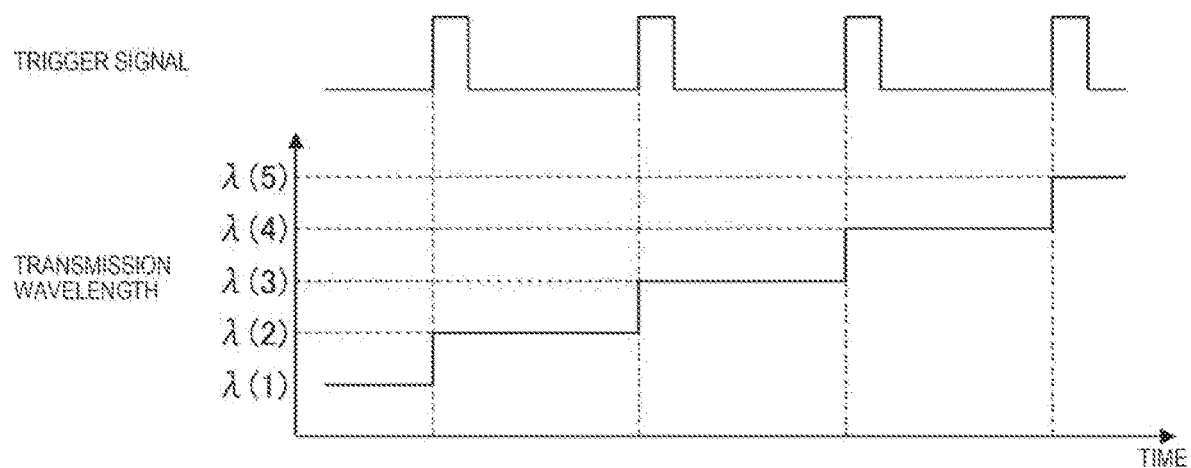
FIG. 8 is another example of the time chart showing the trigger signal and the transmission wavelength of the spectral filter.

For example, as shown in FIG. 8, the drive control unit 22 may detect the timing at which the trigger signal St rises as the wavelength switching timing, and switch the wavelength command value Vc at the wavelength switching timing. Also in such an example, the drive control unit 22 switches the wavelength command value Vc every time the trigger signal St is input.

In the example shown in FIG. 8, the light-receiving control unit 32 preferably detects the timing at which the trigger signal St falls as the signal capture timing. Accordingly, it is possible to wait for the transmission wavelength of the spectral filter 5 to be changed and stabilized for the time from the rising to the falling of the trigger signal St.

Further, the signal capture timing, may be a timing after a specified time elapses after the trigger signal St rises from the low level to the high level, and may be a timing after a specified time elapses after the trigger signal St falls from the high level to the low level.

Modification Example 6

In the above embodiment, the drive control unit 22, ends the wavelength switching processing after outputting the last wavelength command value Vc (n) of the wavelength list L. However the drive control unit 22 may return to the first wavelength command value Vc (1) of the wavelength list L and repeat the wavelength switching processing.

Modification Example 7

In the above embodiment, the spectral filter 5 is exemplified by a transmissive spectral filter that transmits light having a desired wavelength. However, the spectral filter 5 may be a reflective spectral filter that reflects light having a desired wavelength. That is, the transmission wavelength of the spectral filter 5 in the above embodiment may be a reflection wavelength of the reflective spectral filter.

What is claimed is:

1. A spectroscopic device comprising:
   a first controller configured to output a trigger signal, the trigger signal repeatedly alternating between a high level and a low level, the trigger signal having a first timing state and a second timing state, the high level being changed to the low level at the first timing state, the low level being changed to the high level at the second timing state;
   a spectral filter configured to split incident light having a wavelength corresponding to a drive voltage from the incident light and output split light;
   a second controller configured to output a wavelength command value and change a value of the wavelength command value every time one of the first timing state and the second timing state occurs;
   a drive circuit configured to receive the wavelength command value from the second controller and output the drive voltage corresponding to the received wavelength command value; and
   a light-receiving sensor configured to receive the split light and output a light-receiving signal corresponding to an intensity of the received split light every time the other of the first timing state and the second timing state occurs.

2. The spectral filter module according to claim 1, further comprising:
   a storage configured to store a wavelength list that lists a plurality of the wavelength command values, wherein
   the second controller is configured to output the wavelength command value selected from the wavelength list, and
   the second controller is configured to switch the selected wavelength command value every time one of the first timing state and the second timing state occurs.

\* \* \* \* \*